(12) United States Patent
Adams et al.

(10) Patent No.: US 6,181,852 B1
(45) Date of Patent: Jan. 30, 2001

(54) OPTICAL GRATING DEVICE WITH VARIABLE COATING

(75) Inventors: Laura Ellen Adams, Basking Ridge; Benjamin John Eggleton, Berkeley Heights; Rolando Patricio Espindola, Chatham; Sungho Jin, Millington; Hareesh Mavoori, Berkeley Heights; John A. Rogers, New Providence; Thomas Andrew Strasser, Warren, all of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/237,124

(22) Filed: Jan. 26, 1999

Related U.S. Application Data

(63) Continuation-in-part of application No. 09/159,178, filed on Sep. 23, 1998.

(51) Int. Cl.[7] .................................................. G02B 6/34
(52) U.S. Cl. .................................................. 385/37
(58) Field of Search ........................ 385/15, 24, 37, 385/123, 124; 359/130

(56) References Cited

U.S. PATENT DOCUMENTS

| | | | |
|---|---|---|---|
| 5,007,705 | * 4/1991 | Morey et al. | 385/12 |
| 5,394,488 | 2/1995 | Fernald et al. | 385/13 |
| 5,982,963 | * 11/1999 | Feng et al. | 385/37 |
| 5,987,200 | * 11/1999 | Fleming et al. | 385/37 |
| 5,999,546 | * 12/1999 | Espindola et al. | 372/20 |
| 5,999,671 | * 12/1999 | Jin et al. | 385/37 |
| 6,031,950 | * 2/2000 | Fujita | 385/37 |
| 6,108,470 | * 8/2000 | Jin et al. | 385/37 |

FOREIGN PATENT DOCUMENTS

| | | |
|---|---|---|
| 0 785 753 | 8/1998 | (EP). |
| 0 856 752 | 8/1998 | (EP). |
| WO 98 25861 | 6/1998 | (WO). |

OTHER PUBLICATIONS

Lin X–Z et al., "Electrically Tunable Singlemode Fibre Bragg Reflective Filter", Electronics Letters, GB., III Stevenage, vol.; 30, No. 11, May 26 1994, pp. 887–888.

* cited by examiner

*Primary Examiner*—John D. Lee
*Assistant Examiner*—Michelle R. Connelly-Cushwa
(74) *Attorney, Agent, or Firm*—Mathews, Collins, Shepherd & Gould, P.A.

(57) ABSTRACT

A tunable chromatic dispersion compensator for optical communication systems is disclosed. An optical grating, such as a fiber Bragg grating, non-chirped, linearly chirped or non-linearly chirped, is coated on its outer surface with a coating have a variable diameter and strained is applied to the fiber. The fiber may be latchably strained so that the grating characteristics may be changed or tuned while avoiding use of a continuous power supply. Various optical networking applications using such dispersion compensating devices are also disclosed.

20 Claims, 8 Drawing Sheets

POSITION ALONG THE FIBER (cm)

OPTICAL GRATING DEVICE WITH VARIABLE COATING

RELATED APPLICATIONS

This case is a continuation-in-part of U.S. application Ser. No. 09/159,178, filed Sep. 23, 1998.

FIELD OF THE INVENTION

This invention relates to an optical fiber grating device.

BACKGROUND OF THE INVENTION

Optical fibers and fiber gratings are useful for telecommunication transmission and networking. Basically, optical fibers are thin strands of glass capable of transmitting information-containing optical signals over long distances with low loss. In essence, an optical fiber is a small diameter waveguide comprising a core having a first index of refraction surrounded by a cladding having a second (lower) index of refraction. As long as the refractive index of the core exceeds that of the cladding, a light beam propagated along the core exhibits total internal reflection, and it is guided along the length of the core. Typical optical fibers are made of high purity silica, and various concentrations of dopants may be added to control the index of refraction.

Optical gratings are important elements for selectively controlling the paths or properties of traveling light. Gratings based on optical fibers are of particular interest as components in modem telecommunication systems. For example, in long-distance transmission of optical signals, the accumulation of signal dispersion may be a serious problem. This problem intensifies as the signals travel longer distances or with an increase in the number of channels in a wavelength-division-multiplexed (WDM) optical communication system. Efforts to compensate for chromatic dispersion to date have involved use of dispersion compensating gratings, which may be used in combination with dispersion compensating fibers. See M. I. Hayee et al., IEEE PHOTONICS TECHNOLOGY LETT., Vol. 9, No. 9, p. 1271 (1997); R. I. Laming et al., IEEE PHOTONICS TECHNOLOGY LETT., Vol. 8, No. 3 (1996); W. H. Loh et al., IEEE PHOTONICS TECHNOLOGY LETT., Vol. 8, No. 7 (1996); K. O. Hill et al., OPT. LETT., Vol. 19, p. 1314 (1994); and U.S. Pat. No. 5,701,188 issued to M. Shigematsu et al., on Dec. 23, 1997, incorporated herein by reference. The above-mentioned dispersion compensating devices, however, are not flexible and provide only a fixed degree of compensation for chromatic dispersion. More flexible designs are desired, as active control of dispersion is important for high speed systems.

Several designs for in-fiber tunable dispersion compensating elements based on chirped Bragg gratings have been described. A chirped grating may be obtained by applying an external perturbation-generating field (an "external gradient") non-uniformly along the length of the fiber, resulting in non-uniform changes in properties of the fiber grating and a chirp. Use of a temperature gradient as an external gradient to impose a chirp on a fiber grating is described, for example, in U.S. Pat. No. 5,671,307 to Lauzon, issued Sep. 23, 1997, which is incorporated herein by reference. Similarly, it was proposed that a chirp could be induced in a grating using a strain gradient in P.C. Hill & B. J. Eggleton, ELECT. LETT. Vol. 30, 1172–74 (1994). A device involving the etching of the outer surface of the fiber to produce a taper for providing a chirp in the fiber grating region is described in M. A. Putnam et al., "*Fabrication of Tapered, Strain-Gradient ChirpedFiber Bragg Gratings,*" ELECT. LETT. Vol. 31 (1995), at p. 309, also incorporated herein by reference. These etched devices have disadvantages in that hydrofluoric acid is used during fabrication to etch the fiber surface, and the resultant fiber is fragile in that it has significant parts of its cladding etched away.

As may be appreciated, those concerned with technologies involving optical communications systems continue to search for new designs enabling for more flexible methods for providing chirped gratings and compensating for chromatic dispersion. It is desirable to have an optical grating device that may be used as a tunable dispersion compensator whose characteristics and performance may be selectively altered, that does not require a continuous use of power, and that does not require processing methods which weaken the stability of the fiber.

SUMMARY OF THE INVENTION

Summarily described, the invention embraces a device comprising a length of waveguide having a grating region and a coating applied to the fiber proximal the grating region. The coating has a variable outer geometry, preferably a taper, to define a length of waveguide having a variable outer diameter so that, when axial strain is applied to the length of the waveguide, non-uniform changes are induced in the properties of the grating. The variable coating advantageously has a modulus similar to or higher than that of the waveguide, so that when the strain is applied to the length of waveguide, the variation in the properties of the grating may be determined by the geometry of the coating. Many embodiments and applications are contemplated, including dispersion compensator modules, amplifiers, and WDM systems.

BRIEF DESCRIPTION OF THE DRAWINGS

The advantages, nature and additional features of the invention will appear more fully upon considering the illustrative embodiments described in the accompanying drawings. In the drawings.

It is to be understood that these drawings are for purposes of illustrating the concepts of the invention, are not limiting in nature, and except for the graphs, are not to scale.

DETAILED DESCRIPTION OF THE INVENTION

Applicants have discovered that a variable coating comprising a tapered strain relief coating may be applied to a grating device (such as a Bragg grating or long-period grating), to achieve a tunable chirp. When force is applied to the ends of the fiber having the coating, an axial strain is produced that varies along the grating in a manner that may be determined by the mechanical properties and thickness profile of the coating. The strain produces a chirp in the grating which may be attributable to elongation and elasto-optical effects. The chirp produced may be dependent upon the geometry of the coating, e.g., a linearly tapered coating may produce a linear chirp. The rate of the chirping may be varied with changes in the applied force. Force applied to the ends of the coated fiber produces an axial strain that varies along the length of the coated fiber in a manner determined by the thickness profile and modulus of the film: as the thickness or modulus of the coating increases, the strain decreases. The distributed strain alters the optical characteristics of the grating and yields controlled, tunable chirps.

Figure 1A:
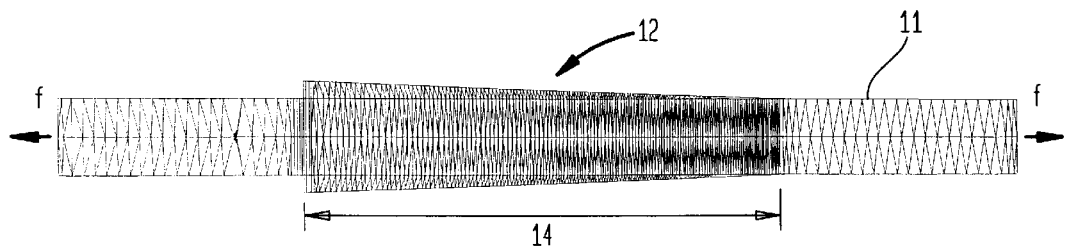
FIG. 1A illustrates a fiber having a coating with a linear taper that is subjected to an axial force.

More particularly with reference to the figures, FIG. 1A shows a fiber 11 that has a grating region 12 and a tapered coating 14 deposited on the outer surface of the fiber 11 at the grating region. The fiber is subjected to an axial force shown generally by arrows "f". The coating may be applied by electrodeposition or other methods for depositing films, including known methods and those described in U.S. application Ser. No. 09/159,178, filed Sep. 23, 1998 (by the inventors herein and assigned to the present assignee), which is incorporated herein by reference. Exemplary advantageous materials for depositing the coating 14 include glass, ceramic, metal, or composite materials.

For example, the fiber grating itself is typically fabricated with silica glass, and the same material may be used for the coating 14. Alternatively, using silica glass, the coating 14 may be integrally formed with the optical fiber, for example, the fiber can be shaped so that is has a variable diameter to define the coating, and the grating structure can be written into the fiber either before or after the coated fiber is fabricated. Metals and alloys also advantageously may be used for the coating, as they may be easily fabricated into gradient structures of variable widths or thicknesses and then bonded onto the fiber at the grating region with adhesives, such as glass adhesives (e.g., low melting point glass), epoxy, or by solder bonding. Another advantageous approach for forming the coating involves depositing onto the surface of the fiber at the grating region metallic or ceramic coatings having a desired thickness or property gradient. Various physical or chemical processing methods may be used to deposit the materials, including sputtering, evaporation, chemical vapor deposition, electrodeposition, electroless deposition, and dip-coating.

The invention invokes an effective variation in radius through the use of tapered coatings that have moduli similar to the fiber. Due to the change in the radius of the fiber along its length, stress applied to the fiber will change the wavelength of the grating. The axial force shifts the wavelength by (i) changing the grating periodicity and (ii) altering (through the photoelastic effect) the index of refraction. Consider, for example, a fiber having a Bragg grating and a coating which is thin relative to the fiber diameter (e.g., the coating has a thickness of between 3 $\mu$m and 30$\mu$m and the fiber has a diameter of about 120 $\mu$m), and where the modulus of the film is similar to the modulus of the fiber. The net fractional change in the Bragg wavelength ($\Delta\lambda_B$) can be computed applying the formula, $$\Delta\lambda_B/\lambda_B = F(1-x)/(E\pi r^2)\,\epsilon_{zz}\,1/r^2$$

where F is the applied force, X is the photoelastic constant, E is Young's modulus, r is the radius of the fiber, and $\epsilon_{zz}$ reflects the axial strain. The axial strain $\epsilon_{zz}$ may be computed applying the formula:

$$\epsilon_{zz} = f/(E\pi r^2)$$

These equations describe the strain distribution away from the edges of the coating when the moduli of the fiber and the film are similar (e.g., the Young's modulus and Poisson ratio of the glass fiber are E=6.2 MPa and v=0.24, respectively, and these values for the coating, e.g., fabricated with silver, may be E=7.4 MPa and v=0.38, respectively). The mechanical response is related to the moduli of the film and fiber and the thickness of the coating: One will obtain a greater variation in the mechanical response of the structure with an increase in either the thickness of the coating or in the difference between the moduli of the film and the fiber. The greater difference there is between the moduli of the coating and the fiber, the greater variation there will be in the mechanical response of the structure. With similar moduli, a linear taper in thickness will yield a strain that varies approximately linearly with position. Also, by using coatings with high moduli (relative to glass), the distribution of strain may be significantly altered even when thin coatings (e.g., less than 30 $\mu$m), are applied to the fiber. For example, a linearly tapered coating that varies in thickness by 30 $\mu$m with an average thickness of 15 $\mu$m deposited on a fiber with a 60 $\mu$m radius will yield a strain that varies approximately linearly with position. In this case, the variation in thickness of the coating is less than one half of the sum of the radius of the fiber and the average coating thickness.

The response for coatings with arbitrary moduli and thickness profiles may be computed using finite element analysis with adaptive mesh refinement to the equations of motion for a system with cylindrical symmetry, i.e.:

$$\frac{1}{r}\frac{\partial(rT_{rr})}{\partial r} - \frac{1}{r}T_{\theta\theta} + \frac{\partial(T_{rz})}{\partial z} + F_r = 0$$

$$\frac{1}{r}\frac{\partial(rT_{rz})}{\partial r} + \frac{\partial(T_{zz})}{\partial z} + F_z = 0$$

Here, $F_r$ and $F_z$ are the r and z components of body forces. The stresses, $T_{rr}$, $T_{\theta\theta}$, $T_{zz}$, and $T_{rz}$ are given by, $$T_{rr} = E\frac{(1-v)}{(1-2v)(1+v)}\varepsilon_{rr} + E\frac{v}{(1-2v)(1+v)}(\varepsilon_{\theta\theta}+\varepsilon_{zz})$$

$$T_{\theta\theta} = E\frac{(1-v)}{(1-2v)(1+v)}\varepsilon_{\theta\theta} + E\frac{v}{(1-2v)(1+v)}(\varepsilon_{rr}+\varepsilon_{zz})$$

$$T_{zz} = E\frac{(1-v)}{(1-2v)(1+v)}\varepsilon_{zz} + E\frac{v}{(1-2v)(1+v)}(\varepsilon_{rr}+\varepsilon_{\theta\theta})$$

$$T_{rz} = E \frac{1}{2(1+v)} \varepsilon_{rz}$$

where E and v are the Young's modulus and Poisson ratio, respectively. The strains, $\varepsilon_{rr}$, $\varepsilon_{\theta\theta}$ and $\varepsilon_{rz}$, are related to the radial ($U_r$) and axial displacements ($U_z$) according to $$\varepsilon_{rr} = \frac{\partial U_r}{\partial r} \quad \varepsilon_{\theta\theta} = \frac{U_r}{r}$$

$$\varepsilon_{zz} = \frac{\partial U_z}{\partial z} \quad \varepsilon_{rz} = \frac{\partial U_r}{\partial z} + \frac{\partial U_z}{\partial r}$$

The zz-component of the strain determines the chirp, i.e.:

$$\Delta\lambda_B(Z)/\lambda_B \; \varepsilon_{zz}(z, r=0)$$

Figure 1B:
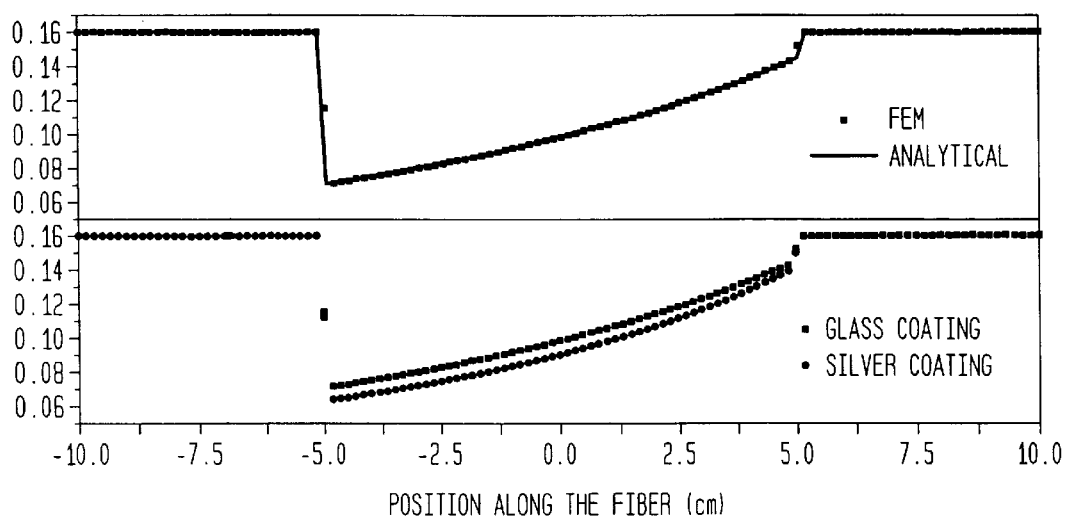
FIG. 1B reflects finite element modeling and approximate analytical computations of axial strain along the fiber of FIG. 1A with the fiber having a diameter of 120 $\mu$m and a coating with a thickness of between 30 $\mu$m and 5 $\mu$m.

FIG. 1B shows finite element modeling and approximate analytical calculations of axial strain ($\varepsilon_{zz}(z, r=0)$) along the fiber of FIG. 1A. Calculations were made based on the linearly tapered coating having a thickness ranging from between 3 and 30 μm on a fiber with a 120 μm diameter. The coating in this case has the same Young's modulus and Poisson ratio as the glass fiber (E=6.2 MPa and v=0.24). At locations of about several millimeters from the edges of the coating, the FEM and analytical calculations agreed. Both indicate a slightly non-linear variation in the strain. The bottom frame of FIG. 1B shows FEM computations of similar samples with coatings of glass and silver (E=7.4 MPa, v=0.38), and illustrates that an increase in the modulus of the coating enhances its ability to relieve strain.

Figure 1C:
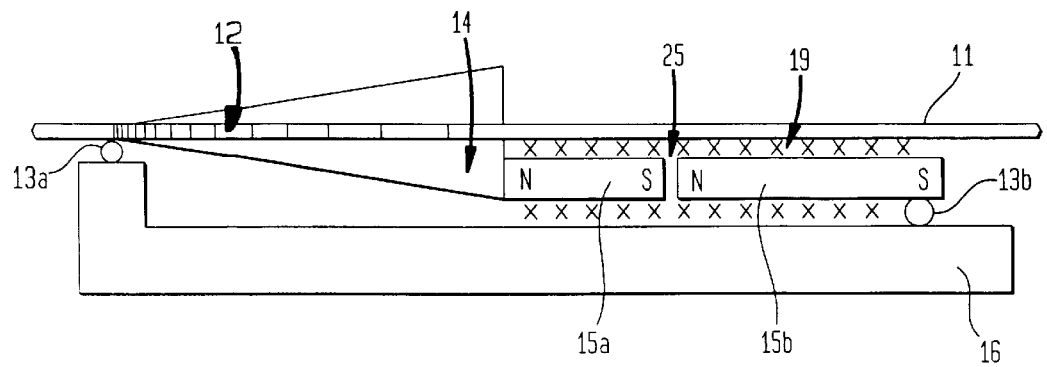
FIG. 1C illustrates a fiber having a variable coating together with a device for imposing a magnetically-induced strain in the fiber.

The strain in the length of waveguide may be magnetically-induced, e.g., with use of a device such as illustrated in FIG. 1C. In FIG. 1C, a mobile magnet 15a is attached directly to the fiber coating 14 adjacent the grating region for inducing strain in the fiber. An immobile magnet 15b is attached to a fixed substrate 16 or guiding rail at bond region 13b. The fiber 11 may at a separate point of attachment also be secured to the guiding rail 16. Here, the component 15a induces a shift in wavelength distribution which can be useful for some dispersion compensating applications. A solenoid 19 with conductive wirings is disposed around the magnetic components so that a magnetic field can be generated when a current is passed into it. The solenoid may be a single solenoid, or it may be split into two or more segments, and if desired, independent controls may be used for enhancing control over the magnetic field generated. The magnetic moments induced in the magnets create an attractive (or repulsive) force between their mating poles which causes a tensile (or compressive) strain in the coating 14 and attached fiber grating 12. Further details regarding devices for inducing strain magnetically, including details regarding materials for fabricating the magnetic components and the coating, are set forth in U.S. application Ser. No. 09/159,178, filed Sep. 23, 1998, incorporated herein by reference.

Figure 2A:
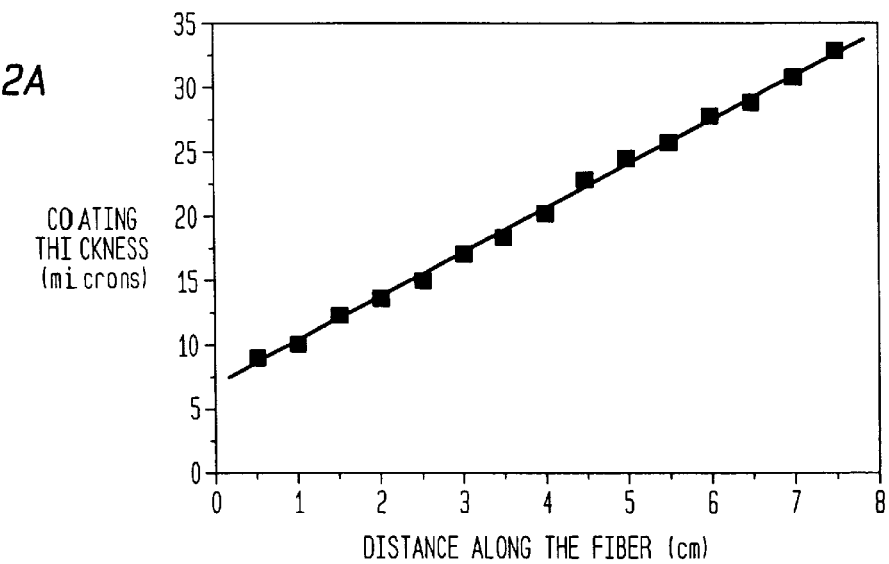
FIGS. 2A–2C reflect optically measured thicknesses for three samples of optical fibers where tapered silver films have been deposited on the fibers by electroplating.
Figure 2B:
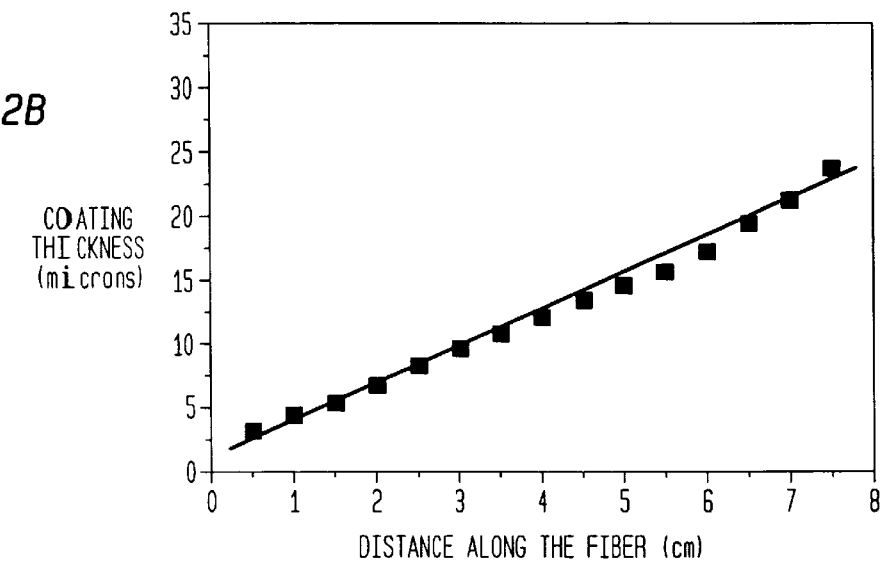
Figure 2C:
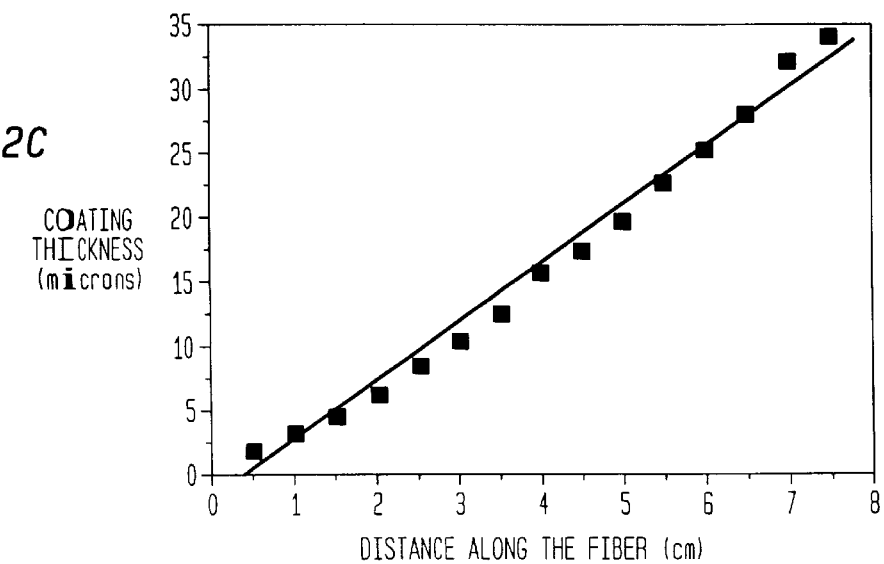

FIGS. 2A through 2C show optically measured thicknesses of tapered silver films that were deposited onto optical fibers by electroplating. As can be seen from these results, coatings may be generated with different slopes. These graphs reflect the typical degree of reproducibility in achieving linear tapers with this invention.

Figure 3A:
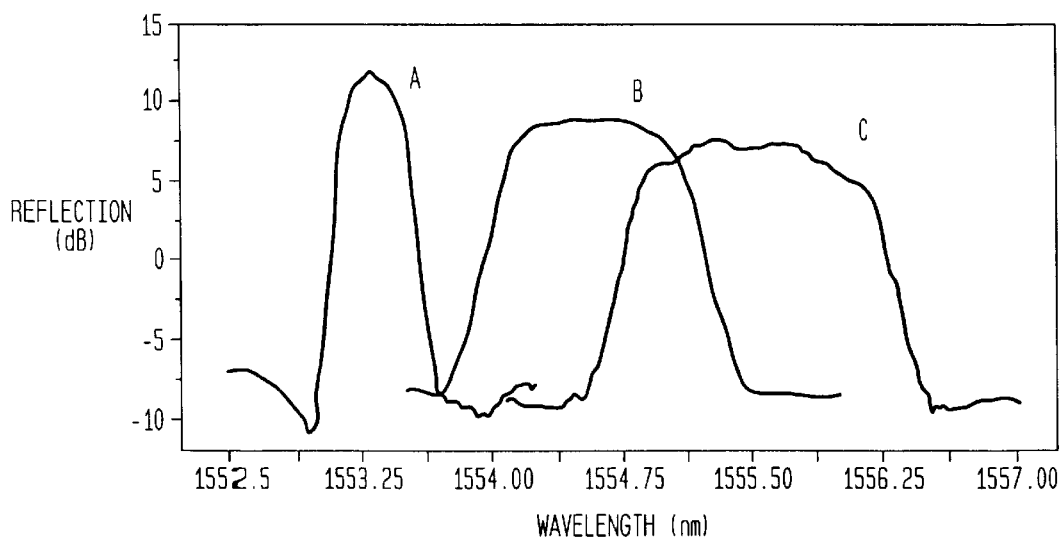
FIG. 3A plots reflectivity spectra for a grating coated with a tapered film having a thickness profile as shown in FIG. 2C, and FIG. 3B plots the shift of the center position of the reflection peak as a function of its change in width.
Figure 3B:
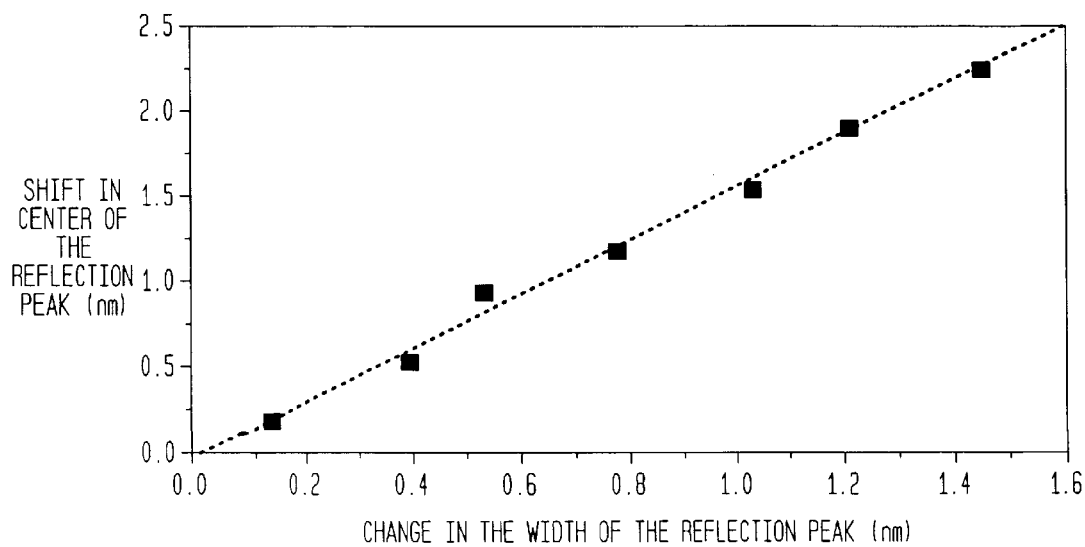

FIG. 3A shows reflectivity spectra for a Bragg grating device coated with a tapered film having the thickness profile illustrated in FIG. 2C. In FIG. 3A, three forces were applied to the ends of the fiber and spectra data in each instance was recorded, as is illustrated with peaks A, B, and C. The broadening and shifting of the reflection peak (e.g., from peaks A to C), is consistent with a strain that varies along the length of the grating. FIG. 3B plots the shift of the center of the reflection peak as a function of the change in width of the reflection peak. The linearity of the data is consistent with a linear mechanical response and a linear relation between the chirp and the strain. If the variation of strain is approximately linear with position along the grating, then the slope of this curve (i.e. the ratio of the shift of the center position to the change in width of the reflection peak), can be written $$\text{slope} = \frac{\text{shift of the center}}{\text{change in width}}$$

$$= \frac{1}{2} + \frac{\varepsilon_{zz}(z=L, r=0)}{\varepsilon_{zz}(z=0, r=0) - \varepsilon_{zz}(z=L, r=0)}$$

where z=0 and z=L are the thin and thick ends of the grating, respectively. The measured slope of the data shown in FIG. 3B is 1.5±0.1. This value agrees reasonably well with the one calculated by finite element analysis, i.e., 1.37. The slight discrepancy may be caused by differences in the moduli of electroplated silver films and bulk silver.

Figure 4:
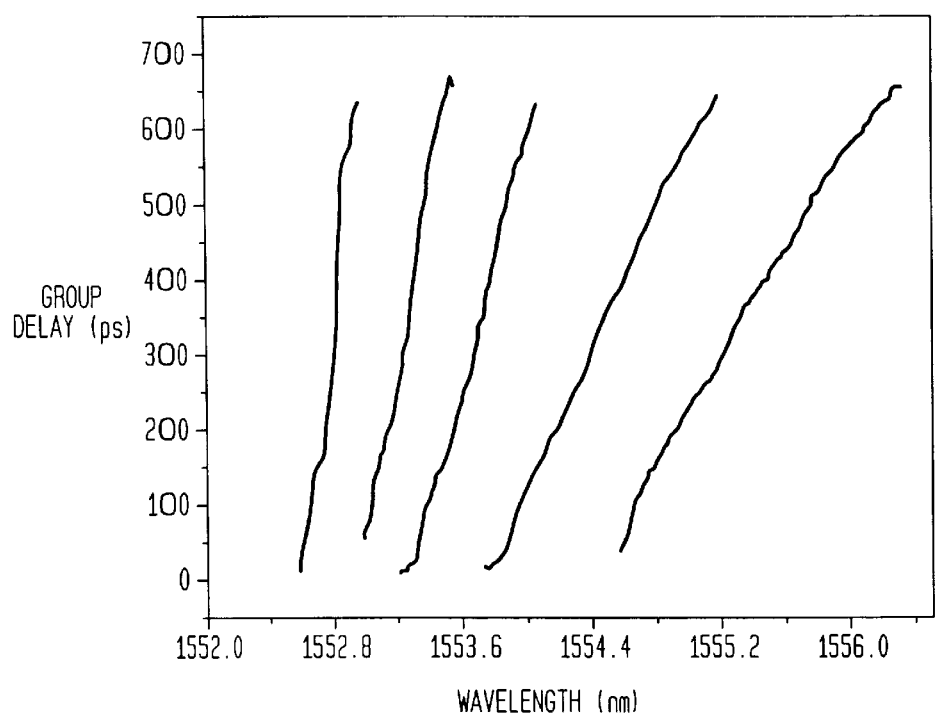
FIG. 4 plots group delays measured across the reflection peak with different forces applied to a grating which is coated with a tapered film having a thickness profile as shown in FIG. 2C.

FIG. 4 plots group delays measured across the reflection peak at different forces for the fiber having a coated with the thickness profile shown in FIG. 2C. As can be seen, the group delays are essentially linear. Linear group delays are consistent with the theory presented. The dispersion is approximately constant in all cases, and the variation of the dispersion is linear in the applied force.

The following is an Example representing a specific embodiment which is intended to be exemplary to aid in understanding the invention and not limiting in nature.

EXAMPLE 1

An apodized fiber Bragg grating (approximately five centimeters long with a reflection peak at about 1553 nm), was written into the core of a photosensitive optical fiber using a phase-mask scanning technique. The outer polymer layer of the fiber was stripped from the section of the fiber containing the grating. The fiber grating was then mounted on an automated rotation stage and placed in an electron-beam evaporator. Titanium (~100 Å as an adhesion promoter), and gold (~1500 Å) were evaporated onto the fiber while it was rotating to form a uniform coating of metal on the outer surface at the stripped region. Fine wires were attached to the ends of the stripped section with silver epoxy to provide an electrical connection for the deposition of silver. The fiber was placed in an electroplating bath for plating at constant current, and while plating, it was pulled from the bath with a programmable translation stage to produce a controlled variation in the thickness of the silver for forming a gradient. The electrodeposition was performed at room temperature on the grating segment of the fiber at a constant current of ~1.5 mA. The fiber was pulled from the bath at a constant rate of ~12 mm/min; for each sample, the deposition was repeated four or five times to increase the thickness of the silver. The thickness gradient in the tapered metal coating was linear along the length of the grating with the coating thickness being about 5 micrometers at one end and about 30 micrometers at the other end to define an integrally-formed variable coating on the fiber.

Figure 5:
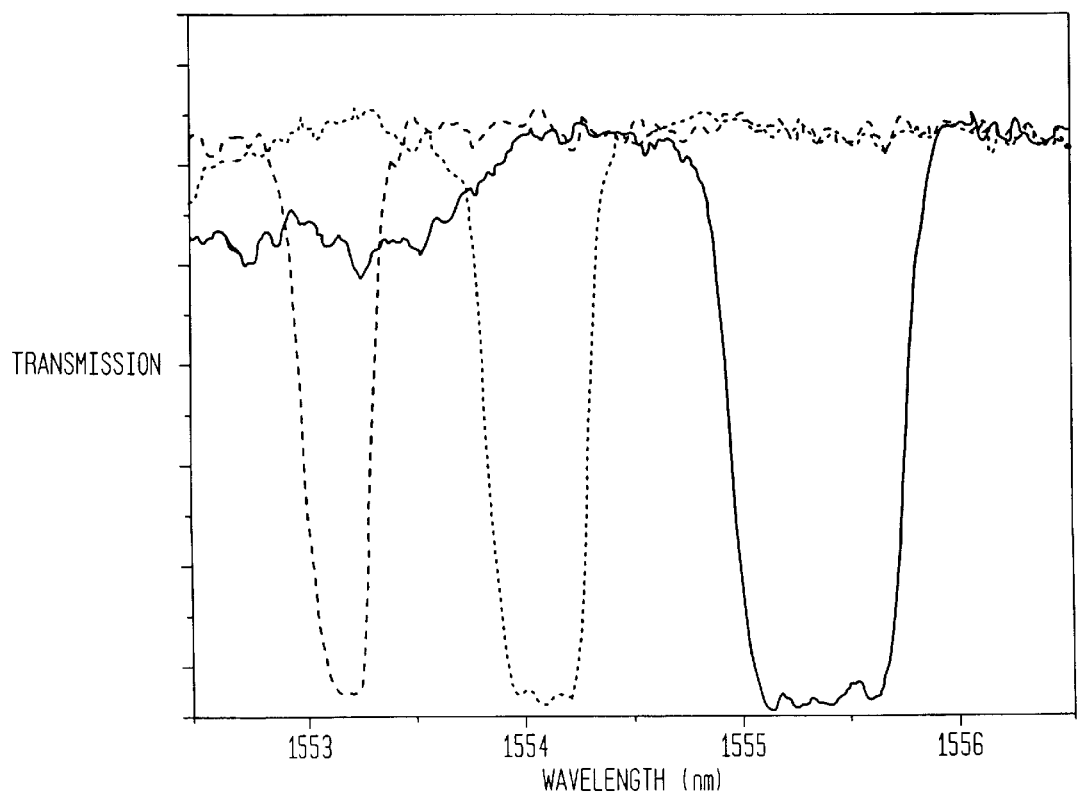
FIG. 5 represents experimental data for transmission as a function of wavelength for a non-chirped grating that has been altered to a chirped grating with a variable coating.

A tensile force was applied to the fiber, and the center wavelength of the grating (originally about 1553.13 nm), was shifted by about 1 nm and 2 nm, which is illustrated in FIG. 5. Looking at FIG. 5, it is evident that a grating-chirping effect was induced due to the presence of the thickness gradient. As the tensile strain was applied, the transmission spectrum of the fiber Bragg grating was substantially broadened (chirped), and the extent of broadening was increased with increasing tension.

Figure 6A:
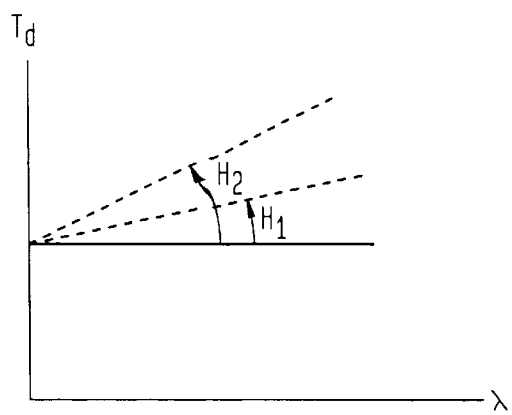
FIGS. 6A–6E are graphs illustrating types of dispersion tuning that may be achieved with the inventive device.
Figure 6B:
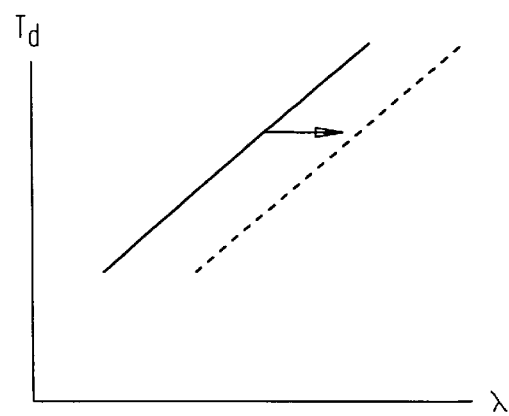
Figure 6C:
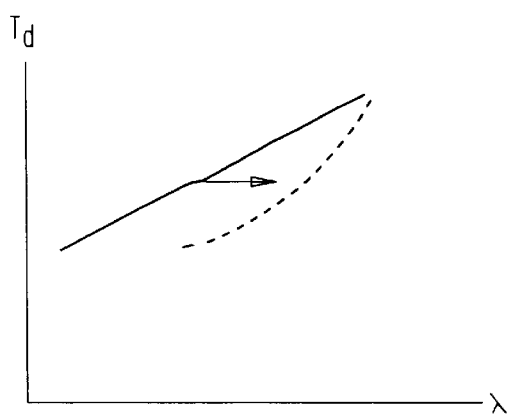
Figure 6D:
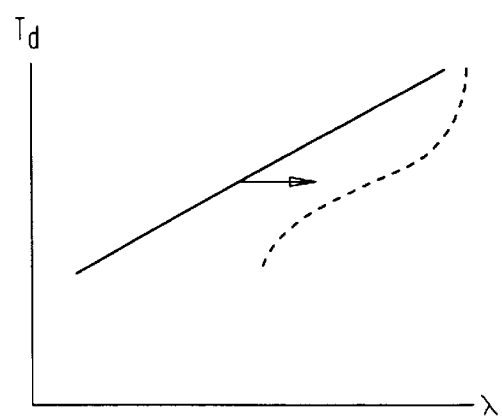
Figure 6E:
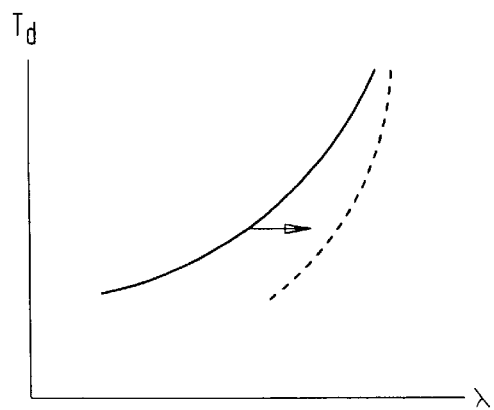

FIGS. 6A–6E are plots of the time delay characteristics $T_d$ (which is a measure of wavelength dispersion) as a function of wavelength $\lambda$ for different embodiments of the inventive grating device, using different grating regions. These plots illustrate various capabilities of the inventive device in terms of altering chromatic dispersion characteristics. FIG. 6A plots data where a non-chirped grating is used and strained using the variable coating to form a chirped grating. The slope, $T_d$ (time delay)/$\lambda$ (wavelength), may be adjusted by changing the applied strain. FIG. 6B shows the translational shift of the $T_d$-$\lambda$ curve where strain has been induced in a uniformly (linearly) chirped grating. FIGS. 6C and 6D illustrate the effects of an embodiment where a linearly chirped dispersion compensating grating is used and strained to exhibit the characteristics of a nonlinear chirped grating. FIG. 6E reflects use of a non-linearly chirped grating which has been made more nonlinear. There are particular advantages as to each of these embodiments depending on the types and the extent of dispersion to be compensated, as should be apparent to one skilled in the field.

The tapered strain relief coatings of this invention provide a convenient means to achieve tunable chirped gratings including tunable chirped Bragg and long-period gratings. The tapered coatings provide adjustable and controllable linear and non-linear chirps determined by the thickness profile and modulus of the coating and the applied force (or current). Such coated fibers provide advantages in that they are simple, low in cost to fabricate, compact in size, and allow for a controlled dispersion profile. The inventive device can be integrated with latchable actuators (such as magnetic systems developed for tuning Bragg gratings and as illustrated in FIG. 1C), so that these devices provide the additional advantage that their operation does not require a continuous supply of power.

An additional advantage of the inventive device is that it may be used to counteract a shift in the center of the reflection peak to longer wavelengths as the chirp is increased. The tapered coatings may be used together with thermal effects to counteract the shift in the center of the reflection peak. For example, as described in U.S. Pat. application Ser. No. 09/183,048, filed Oct. 30, 1998, by inventors Eggleton, Rogers, and Strasser herein, which is assigned to the present assignee and incorporated herein by reference, applicants have discovered that a heat-transducing body may be deposited on the fiber at the grating region for inducing or altering a chirp with a temperature gradient applied to the fiber. A distributed thin film resistive heater may be electroformed onto the fiber containing a grating such as, for example, a conventional apodized Bragg grating. A heater may be formed on the fiber consisting of thin tapered metal coatings electroplated onto the outer surface of the fiber as the fiber is being pulled from a plating bath at a controlled rate. In these structures, a temperature gradient chirps the grating with the rate of chirping defined by the thin film and the applied current. These thermally-actuated gratings can provide adjustable linear and non-linear chirps. Reflection-mode devices that use ~6 cm long gratings, for example, can be tuned to eliminate dispersion between ~1200 and 300 ps/nm.

Fibers having heat-transducing bodies may be used in conjunction with tapered strain relief coatings so that either the strain relief coating or the heat-transducing body counteracts a shift in the center of the reflection peaks. A silver coating whose thickness varies between ~500 Å and 0.5 $\mu$m, for example, can provide a thermal gradient to the grating without contributing any significant mechanical effect. In this case, the mechanical effects of the tapered coating (which serve as a heater) do not cause undesired changes in the chirp upon application of force; however, the tapered coating may counteract a shift in the center of the reflection peak. Conversely, with strained devices (e.g., where the mechanical effects alter the chirp), uniform heating may be applied to counteract shifts associated with the application of force. Such uniform heating may be achieved by depositing a uniform resistive film onto a fiber having a nonconducting strain relief coating. Alternatively, a thin insulating layer formed on a tapered metal coating may serve as a platform for the deposition of a uniform resistive heater.

Figure 7:
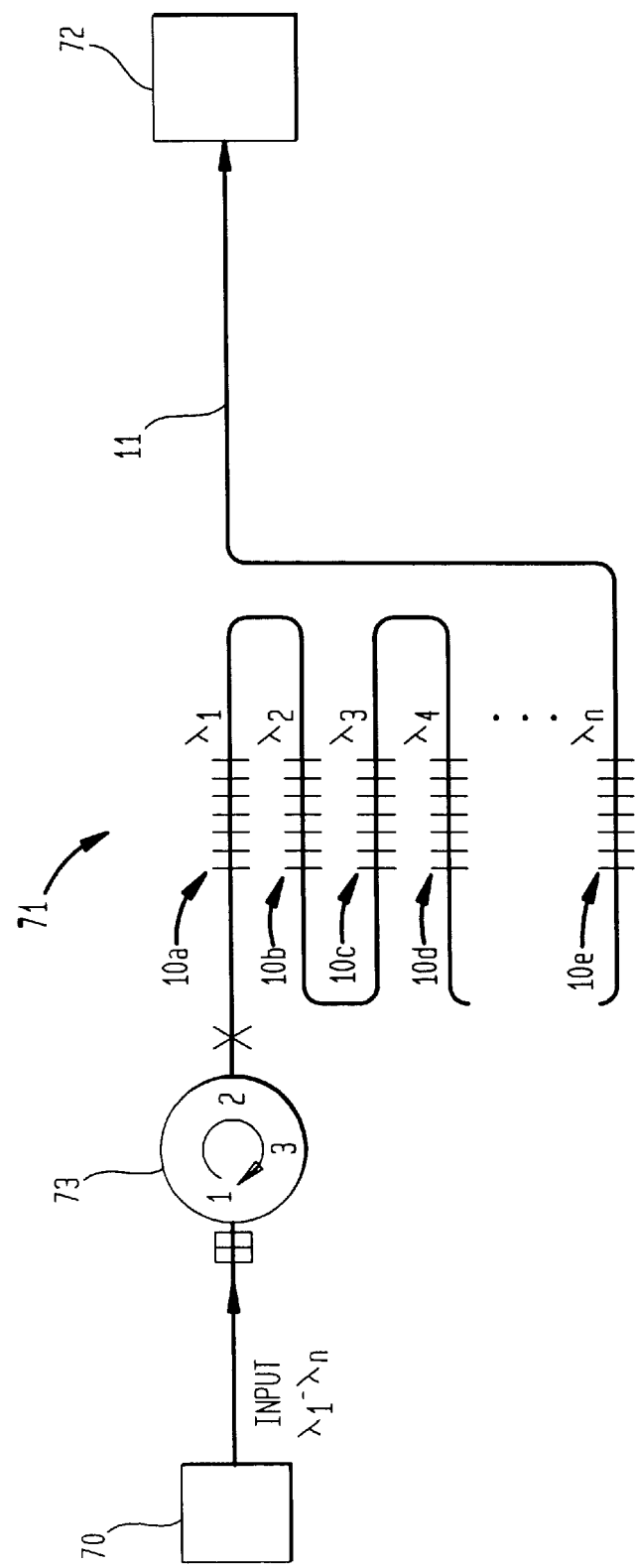
FIG. 7 schematically illustrates a dispersion-compensator assembly for an n-channel WDM communication system.

Many embodiments and applications are contemplated, including dispersion compensator modules, amplifiers, and WDM systems. In FIG. 7, an example of a wavelength division multiplexed (WDM) communications system is schematically illustrated comprising a transmitter 70, an improved N-channel multiplexer/demultiplexer 71, and a receiver 72, all connected by trunk fiber 11. The input to the fiber 11 from the source 70 consists of optical signals at several wavelengths, $\lambda_1$ to $\lambda_n$. The improved multiplexer 71 comprises at least one circulator 73 and a series of independently tunable dispersion compensating fiber gratings (10a, 10b, 10 c, 10d, 10e), each of which may be non-chirped, linearly-chirped or non-linearly chirped. Since the inventive dispersion compensator is capable of having a broad bandwidth, each dispersion compensator can compensate for a few to several channels, and the total number of the tunable dispersion compensators used in the system can be substantially reduced as compared with previous systems.

Figure 8:
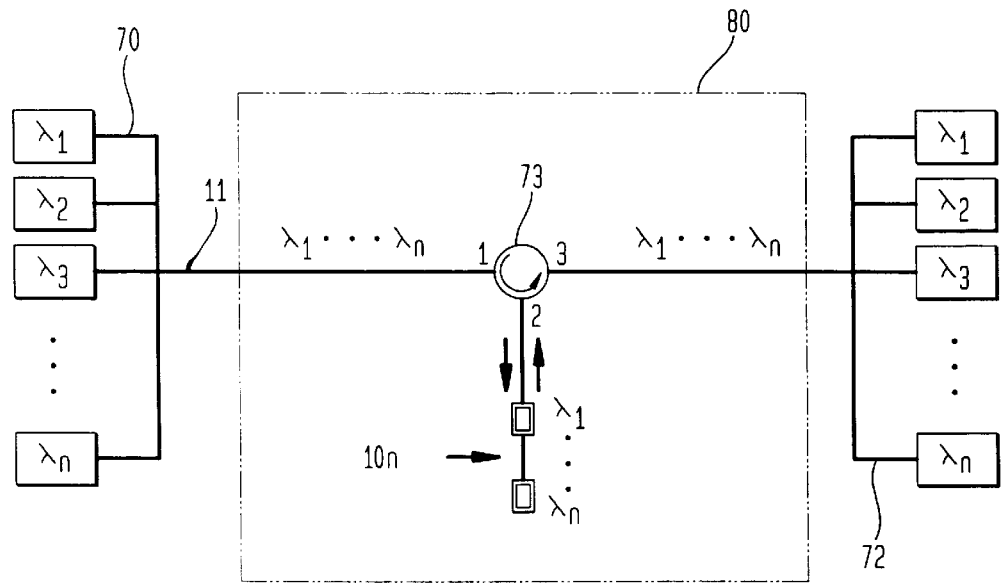
FIGS. 8–11 schematically illustrate optical communication systems comprising the inventive grating device.

FIGS. 8–11 schematically illustrate optical communication systems comprising inventive tunable dispersion-compensating devices. In FIG. 8, a dispersion compensating module (DCM) at boxed region 80 comprises an optical circulator and a total of "n" number of independently tunable dispersion-compensating gratings 10n. The order in which the gratings may be placed in the module depends on the chromatic dispersion that has accumulated in the system before reaching the DCM. For example, if the accumulated dispersion ($A_D$) for channel 1 at $\lambda_1$ is greater than that of channel n at $\lambda_n$ ($A_D\lambda_1 > A_D\lambda_n$), then the gratings are arranged in the order shown, i.e., the first compensating grating of the DCM is at $\lambda_1$ and the last is at $\lambda_n$. If the accumulated dispersion for channel 1 at $\lambda_1$ is less than that of channel n at $\lambda_n$ ($A_D\lambda_1 < A_D\lambda_n$), then the gratings are arranged in the reverse order shown, i.e., the first compensating grating of the DCM is at $\lambda_n$ and the last is at $\lambda_1$. This DCM may comprise part of a dense WDM system (DWDM), further comprising a multi-wavelength transmitter 70, a length of optical fiber 11, and a multi-wavelength receiver 72.

Alternatively to the embodiment of FIG. 8, the DCM may comprise a single tunable dispersion compensating chirped fiber grating, as previously described, in place of the "n" number of independently tunable dispersion-compensating gratings 10n. In this case, the direction of the chirped gratings will depend on the accumulated chromatic dispersion, i.e., if at channel 1 $A_D\lambda_1 > A_D\lambda_n$, then the chirped fiber grating is disposed such that at the point of entry, the grating is at $\lambda_1$, but if at channel 1 $A_D\lambda_1 < A_D\lambda_n$, the chirped fiber grating is disposed such that at the point of entry, the grating is at $\lambda_n$.

Figure 9:
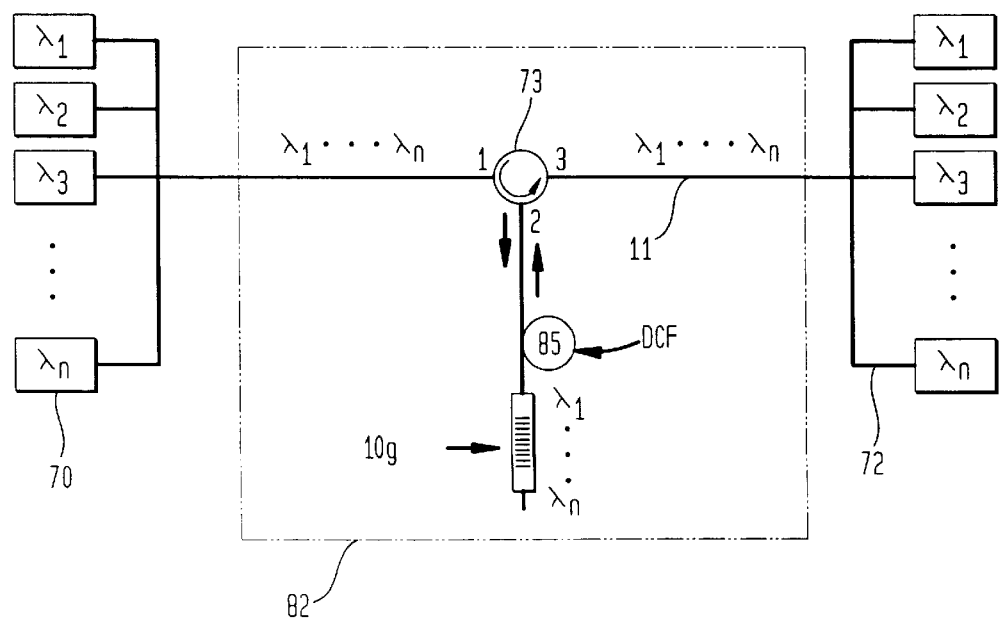

FIG. 9 schematically illustrates a system where a DCM 82 comprises an optical circulator 73, a length of dispersion compensating fiber (DCF) 85, and a single tunable dispersion compensating chirped fiber grating 10g. Alternatively to the single chirped grating device 10g, a plurality or n-number of independently tunable dispersion compensating gratings may be used (e.g., the n-number of gratings 10n of FIG. 8 may be substituted for the single chirped grating 10g of FIG. 9). In this case, the majority of the chromatic dispersion compensation is performed by the DCF 85. The remanent chromatic dispersion in each channel, due to a dispersion slope mismatch between the ideal compensator and the DCF, is compensated using the compensating chirped grating 10g (or the n-number of independently tunable dispersion compensating gratings 10n). The same principles described above with reference to FIG. 8 relating to the direction of the chirped dispersion grating 10g or the order of the n-number of gratings 10n apply with regard to the embodiment of FIG. 9. Also as in FIG. 8, this DCM 82 may comprise part of a DWDM further comprising a multi-wavelength transmitter 70, a length of optical fiber 11, and a multi-wavelength receiver 72.

Figure 10:
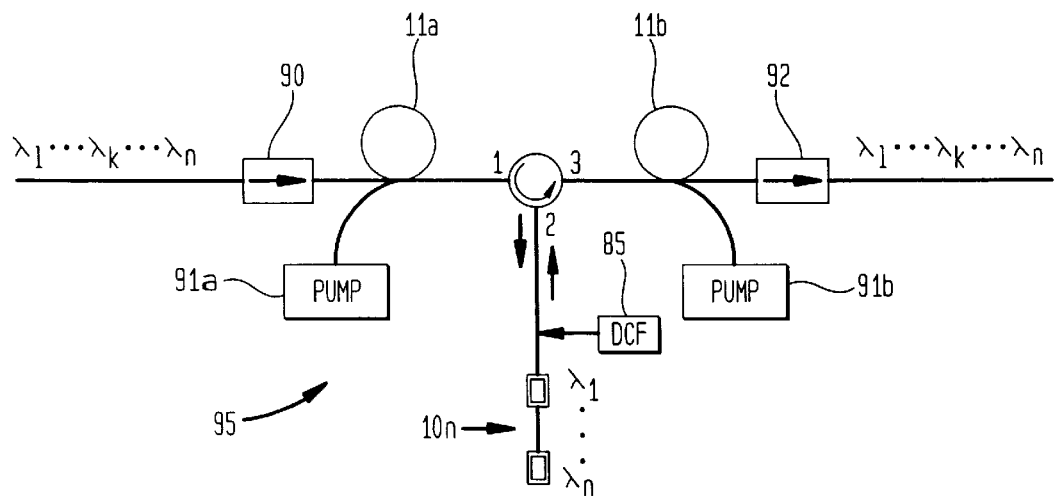
Figure 11:
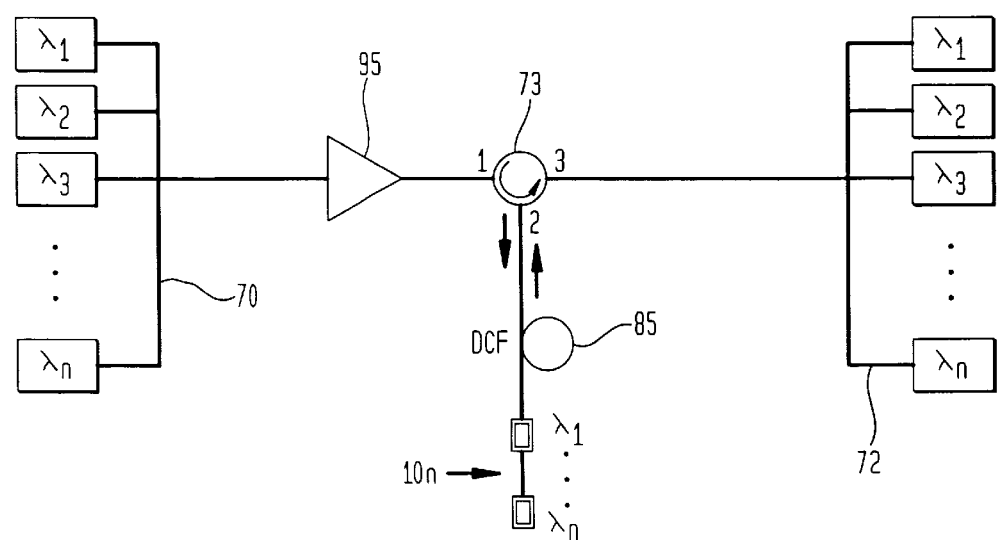

FIG. 10 schematically shows an amplifier 95 having a dispersion compensating module. The amplifier comprises an input isolator 90, a first length of rare-earth doped fiber 11a, a first pump 91 for optical pumping the first length of fiber 11a, a second length of rare-earth doped fiber 11b, a second pump 91 b for optical pumping the second length of fiber lib, an output isolator 92, a circulator 73, and "n" number of independently tunable dispersion-compensating gratings 10n. The optical amplifier provides the advantage that it not only compensates for chromatic dispersion, but it also amplifies the signals to offset losses introduced by the tunable compensator. Optionally, a dispersion compensating fiber 85 may be used in this amplifier assembly, similarly to FIG. 8. FIG. 10 schematically illustrates a DWDM comprising a multi-wavelength transmitter 70, a length of optical fiber 11, an amplifier 95 which may comprise the amplifier of FIG. 9 containing the DCM, a DCM, and a multi-wavelength receiver 72, where the DCM comprises an optical circulator 73, an optional length of dispersion compensating fiber (DCF) 85, and a series of tunable dispersion compensating fiber gratings 10n.

It is to be understood that the above mentioned embodiments are illustrative of only a few of many embodiments which can represent applications of the invention. Numerous and varied other arrangements can be made by those skilled in the art without departing from the spirit and scope of the invention.

We claim:

1. An article comprising a grating device, the grating device comprising:
   a length of waveguide including a grating region comprising a plurality of spaced-apart grating elements;
   a variable coating applied on the outer surface of the waveguide proximal the grating region, the coating having a variable outer geometry so that when an axial strain is applied to the waveguide the variable coating causes the spacings between the grating elements to change to a variable degree.

2. The article of claim 1, in which the grating region defines a non-chirped grating before the application of the axial strain, whereby when the axial strain is applied to the waveguide the variable coating causes the spacings between the grating elements to change to define a chirp in the grating region.

3. The article of claim 2, in which the coating is integrally formed by physical or chemical processing methods including sputtering, evaporation, chemical vapor deposition, electrodeposition, electroless deposition, and dip-coating.

4. The article of claim 1, in which the grating region defines a chirped grating before the application of the axial strain, whereby when the axial strain is applied to the waveguide the variable coating causes the spacings between the grating elements to change the chirp in the grating region.

5. The article of claim 1, in which the length of waveguide comprises a length of optical fiber and the coating is integrally formed on the fiber.

6. The article of claim 1, in which the grating is an optical Bragg grating.

7. The article of claim 1, in which the grating is a long-period grating.

8. The article of claim 1, in which the coating comprises a magnetic material and the axial strain is induced in the fiber with one or more magnetic components disposed alongside the fiber.

9. The article of claim 8, further comprising a source for inducing a magnetic field, a fixed substrate, and two magnetic components, in which one magnetic component is secured to the fiber and the other magnetic component is secured to the fixed substrate, the mating poles of the magnetic components being aligned so that when the source induces a magnetic field, the magnetic components are attracted to or repelled from each other to induce the strain in the fiber.

10. The article of claim 9, in which at least one magnetic component is comprised of a material whose magnetic properties are modifiable by a pulse magnetic field.

11. The article of claim 1, in which the strain is latchable so that the dispersion compensating characteristics of the waveguide may be controllably altered without a continuous supply of power.

12. The article of claim 1, in which the outer geometry of the variable coating comprises a linear taper.

13. The article of claim 12, in which the coating varies in thickness from a first thickness to a second thickness, the fiber has a certain diameter, and the variation in thickness of the coating from the first thickness to the second thickness is less than one half of the sum of the radius of the fiber and the average coating thickness.

14. The article of claim 1, in which the coating comprises glass integrally formed on the fiber.

15. The article of claim 1, further comprising a heat-transducing body disposed on the outer surface of the waveguide proximal the grating region.

16. A dispersion compensating module comprising an optical circulator and at least one grating device according to claim 1 for compensating for dispersion.

17. A wavelength division multiplexed optical communications system comprising a source of multiple wavelength optical signal channels, an optical fiber trunk, a receiver for receiving multiple optical signal channels, a multiplexer/demultiplexer, and one or more grating devices according to claim 1 for compensating for dispersion.

18. The system of claim 17 further comprising a length of dispersion compensating fiber.

19. An optical amplifier comprising an input isolator, a first length of rare-earth doped fiber, a first pump for optical pumping the first length of fiber, a second length of rare-earth doped fiber, a second pump for optical pumping the second length of fiber, an output isolator, a circulator, and a plurality gratings according to claim 1, which are independently tunable, for dispersion compensation.

20. A dispersion compensating module comprising at least one grating according to claim 1, which is tunable, for dispersion compensation, operating in the transmission mode.

* * * * *